United States Patent Office 3,437,626
Patented Apr. 8, 1969

3,437,626
STABILE, AQUEOUS EMULSIONS OF ETHYLENE COPOLYMERS
Dietrich Glabisch, Opladen, Germany, assignor, by mesne assignments, to Gulf Oil Corporation, Pittsburgh, Pa., a corporation of Pennsylvania
No Drawing. Continuation of application Ser. No. 79,122, Dec. 29, 1960. This application Apr. 8, 1968, Ser. No. 719,771
Claims priority, application Germany, Jan. 2, 1960, F 30,219
Int. Cl. C08f 1/13, 15/14
U.S. Cl. 260—29.6                                     13 Claims

ABSTRACT OF THE DISCLOSURE

Stabile aqueous emulsions of ethylene copolymers are prepared without the aid of emulsifiers.

CROSS REFERENCE TO OTHER APPLICATION

This is a continuation application of application Ser. No. 79,122 filed Dec. 29, 1960, by Dietrich Glabisch.

The present invention relates to stable aqueous emulsions of ethylene copolymers, and to processes for the production of such emulsions.

It is known to polymerise ethylene in aqueous emulsion in the presence or absence of emulsifiers by means of compounds forming free radicals, i.e. initiators such as inorganic or organic peroxides, or azo compounds, while maintaining special conditions, and in certain cases to copolymerise ethylene with other suitable components. However, the known processes of this type have a number of disadvantages.

If ethylene is subjected to homopolymerisation in the aqueous phase without adding emulsifiers, at least 10% but in most cases about 20% of an initiator (based on the polymer), for example alkali metal persulphates, are necessary in order to produce stable emulsions, i.e. emulsions which can be stored. The emulsions obtained hereby have a very low solid body content which is generally below 10% and usually only about 5%. On the other hand, these products produced without the aid of emulsifiers do not constitute a pure high molecular weight polyethylene, but wax-like low molecular weight products. On account of the presence of high concentrations of an alkali metal persulphate initiator in the polymerisation process, these products contain incorportaed —SO° and —OSO₃°-groups, which determine the washing and emulsifying power of these compounds. By suitably working up, it is possible to isolate the corresponding fatty alcohols from these sulphonated waxy products. The polymerisation process also presupposes pH values higher than 7, advantageously 7 to 11.

With the homopolymerisation of ethylene in the aqueous phase in the presence of emulsifiers, it is necessary to have a strongly alkaline medium and at least 10 to 20% of a water-soluble initiator, based on polymer.

Furthermore, it is known to polymerise ethylene in emulsion alone or in the presence of small quantities of water-soluble vinyl compounds, such as vinyl sulphonic acids, also with the aid of small quantities of water-insoluble initiators, such as organic peroxides or azo compounds. Nevertheless, the presence of emulsifiers is necessary in these cases.

All emulsions or dispersions prepared with the aid of emulsifiers have the disadvantage that they form coatings which because of the emulsifier content, show hydrophilic properties and thus an undesirable capacity for being re-emulsified.

It has now been found that stable aqueous emulsions of ethylene copolymers can be obtained without using emulsifiers if ethylene is copolymerised at pressures above 100 atm. in the presence of 0.1 to 10%, based on the polymer, of mono-olefinically unsaturated acid compounds using water-soluble substances capable of forming free radicals as polymerisation initiators.

The mono-olefinically unsaturated copolymerisation components should be of acid characters, that is to say, they should contain one or more acid functions, advantageously carboxyl or sulphonic acid groups. This acid function can of course also be represented by other groupings, for example sulphimide groups.

Moreover, especially to be considered within the scope of the present invention are those monoelefinically unsaturated compounds having one or more acid functions, which adjacent to a carbon-carbon double bond also carry groupings which activate this double bond as regards the capacity for polymerisation or copolymerisation. Such groupings are more especially carbonyl groups, ntirile groups and halogen atoms as well as aromatic double bond systems in the α-position to the carbon-carbon double bond.

Suitable components of the above type which can be copolymerised with ethylene are water-soluble mono-olefinically unsaturated acid compounds, such as α,β-olefinically unsaturated monocarboxylic or dicarboxylic acids, for example acrylic, methacrylic, crotonic, maleic, fumaric or itaconic acids and the alkali metal or ammonium salts of these acids.

It has been found that mono-olefinically unsaturated acid compounds especially suitable for the present process are those of which the acid function is separated from a carbon-carbon double bond by at least three carbon atoms or a hetero atom and two carbon atoms, this carbon-carbon double bond being activated by groupings as indicated above.

Especially mentioned as compounds of this type are those which conform to the general Formula I.

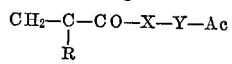

In this formula: R can represent —H or —CH₃, X can represent —NH—, —O—, —S— or —NR'—, in which R' can be a lower aliphatic hydrocarbon radical with 1–5 carbon atoms, Y can represent a straight or branched chain divalent hydrocarbon radical with at least 2 but preferably not more than 18 carbon atoms, which can be interrupted by one or more hetero atoms, for example urea or urethane groupings, Ac can represent —COOH or —SO₃H.

The following are mentioned as examples of compounds of this type, in which X represents an NH-group and Ac carboxyl group: methacrylaminoacetic acid, acyrlaminoacetic acid, methacryl-β-aminopropionic acid, acryl-β-aminopropionic acid, acryl-α-aminopropionic acid, methacryl-γ-aminobutyric acid, acryl-α-aminobutyric acid, methacryl - ω - aminocaproic acid, acryl-ω-amino-caproic acid, acryl-ω-aminoundecanic acid and methacrylaminoundecanic acid. Compounds of the aforesaid type can be prepared by methods known per se, for example by the Schotten-Baumann reaction by reacting methacrylic acid or acrylic acid chloride with aminocarboxylic acids. This is described in German patent application F 26,521 and the corresponding copending United States patent application Ser. No. 835,845, filed on the Aug. 25, 1959.

Examples of compounds in which the radical X in the above formula represents an oxygen atom and Ac a carboxyl group, are methacryl glycolic acid, acryl glycolic acid, methacryl-β-hydroxypropionic acid, acryl-γ-hydroxybutyric acid, methacryl-γ-hydroxybutyric acid.

Methacryl taurine, methacryl-N-butyl taurine and acryl taurine are to be mentioned as examples of compounds in which, in a manner analogous to the aforesaid formula, the radical X represents an NH group and Ac a sulphonic acid group.

In the aforesaid formula, X can represent an oxygen atom and Ac simultaneously a sulphonic acid group. Methacryl isethionic acid is an example thereof.

It is also possible to consider for the purposes of the present process compounds in which, in accordance with the aforesaid general formula, X represents an oxygen atom and Ac a sulphonic acid or carboxyl group, and the alkyl radical can be interrupted by hetero atoms, for example by ureido or urethane groupings. Mentioned as examples of compounds of this type are more especially the reaction products of unsaturated isocyanates, such as ethylacrylate-$\beta$-isocyanate or ethylmethacrylate-$\beta$-isocyanate, with corresponding amino- or hydroxycarboxylic acids. The following compounds are examples thereof: ethyl methacrylate-$\beta$-ureidoacetic acid, ethyl acrylate-$\beta$-ureidoacetic acid, ethyl methacrylate-$\beta$-ureidoethane sulphonic acid, ethyl acrylate-$\beta$-ureidoethane sulphonic acid, ethyl methacrylate-$\beta$-urethanoacetic acid and ethyl acrylate-$\beta$-urethanoacetic acid.

Another group of compounds suitable for the present process is constituted by the water-soluble aliphatic or aromatic sulphonic acids containing vinyl or allyl groups, such as vinyl sulphonic acid, p-styrene sulphonic acid or allyl sulphonic acid and methylallyl sulphonic acid. Furthermore, monoolefinically unsaturated acid compounds suitable for the present process are disulphimides, as for example 3-(methacroylamino)-benzene sulphonic acid-(N-benzene sulphonyl)-amide, 3-(acroylamino)-benzene sulphonic acid-(N-benzene sulphonyl)-amide. Furthermore, maleic acid semi-esters, both with short and long carbon chains in the alcohol component, i.e., semi-esters of maleic acid and aliphatic saturated monohydric alcohols with 1–18 carbon atoms can be used as suitable co-polymerisation components. Mentioned as examples of these compounds are: ethyl, propyl, butyl, octyl, decyl and dodecyl maleate.

All the monoolefinically unsaturated acid compounds hereinbefore referred to are used in quantities from 0.1 to 10%, preferably 1 to 5% by weight, calculated on the polymer.

The polymerisation in accordance with the present invention must be started by initiators which constitute water-soluble substances capable of forming free radicals, preferably inorganic peroxy compounds, such as potassium sodium or ammonium peroxy disulphates, alkali metal perborates, hydrogen peroxide or others. The aforesaid water-soluble per compounds can in addition be used in the form of Redox systems, i.e. in combination with reducing agents, in a manner known per se. Suitable reducing agents are for example the alkali metal salts or ammonium salts of pyrosulphites, bisulphites or sulphoxylates, such as sodium pyrosulphite or bisulphite, sodium formaldehyde sulphoxylate in the case of Redox systems which operate in acid medium, or alkanolamines such as diethanolamine or triethanolamine in the case of Redox systems operating in alkaline medium.

The quantities of water-soluble substances capable of forming free radicals are 0.1 to 3% by weight, related to the polymer; in the case where they are used in the form of Redox systems, preferably there is added that quantity of reducing agent which corresponds to the equivalent quantity of water-soluble substance forming free radicals. For the production of stable latices, having a high solid content, only very small quantities of initiator are required as compared with other processes in which for example up to 20% by weight of initiator (again related to the polymer) must be used and in which waxy products are formed. In contrast thereto, the polymerisation in the presence of water-insoluble initiators, such as organic peroxides, does not lead to emulsions, but to polymers which cannot be wetted with water and which are precipitated in powder form.

The polymerisation according to the present invention is carried out at ethylene pressures higher than 100 atm. but preferably between 200 to 500 atm. The polymerisation temperature depends on the initiator or initiator system actually being employed. Especially to be considered are polymerisation temperatures between 10–100° C. and preferably between 50 and 80° C. Depending on the reaction conditions which are chosen, the polymerisation time is usually between 10 and 24 hours.

Although the polymeristation can be carried out in both alkali and neutral or weakly acid medium, i.e. in the pH range between approximately 5 and 10, the best possible results are obtained when the reaction is carried out in a pH range of from 6 to 7.5. Since the hydrogen ion concentration of the reaction medium is shifted in the direction of lower pH values during the polymerization because of decomposition of the peroxy-disulphates, it is often advantageous in order to produce relatively high yields, when using peroxydisulphates for maintaining a predetermined pH range, to add buffering substances in quantities of less than 1%, (related to the polymer), to the reaction medium. For this purpose, mixtures of primary and secondary potassium phosphate have proved especially suitable. By this means, it is possible to avoid a lowering of the pH value to below 6.

The process according to the invention makes it possible to operate with very small quantities of initiator, by comparison with other ethylene emulsion polymerisation processes which are carried out without emulsifiers, or to avoid in this way the formation of waxy products of low molecular weight with relatively large proportions of fatty alcohol or fatty alcohol sulphonates. Stable emulsions of polyethylene of relatively high molecular weight, that is to say, emulsions which can be stored for several months, are obtained. In contrast to polymers which are prepared with the aid of emulsifiers, for example on the basis of long-chain alkyl sulphonates, the polymers of the present invention are cross-linked. In spite of dispensing with the addition of the emulsifiers, the present process makes it possible for solid contents of emulsions of higher than 20% to be obtained directly, that is to say, without separate condensation processes. Such latices can be diluted with an desired quantities of water without any coagulation occurring or they can also be concentrated, for example up to 45%, or can be adjusted with ammonia solution or alkalis to higher pH values, for example pH 11. With the products which can be obtained according to the process, the quantities of the incorporated acid groups are not in any way sufficient to cause a re-emulsifying capacity of the polymers applied to subtrata, such as textiles and the like. This property constitutes a considerable advantage over emulsions which contain emulsifiers. The present process also provides the advantage that polymerisation can be satisfactorily effected not only in an alkaline medium, but also in a weakly acid medium. In contrast to comparable known processes, the best possible results are obtained at pH values of 6 to 7.5.

The emulsions prepared according to the invention can be used for a wide range of purposes. For example, by drying such emulsions at room temperature and perhaps also at higher temperatures, such as between 100 and 150° C., opaque films with very good flexibility are obtained and these films are distinguished by hydrophobic properties. The lack of an emulsifier of low molecular weight means that the coatings or impregnations produced by means of the emulsions which have been described are hydrophobic and consequently cannot be re-emulsified. Such emulsions can therefore, be used with advantage for the impregnation of substrates as for example textiles, paper, leather and other materials. Furthermore, the products obtained by the process according to the invention, because of their content of acid groups, are capable of being dyed with basic dyestuffs.

Where coagulation is desired in special cases, this can be achieved by using almost completely dissociated electrolyte solutions. Suitable electrolyte solutions are diluted solutions, i.e. advantageously substantially 3% solutions, up to saturated aqueous solutions of alkali metal, ammonium, alkaline earth metal salt of strong inorganic acids, as for example hydrochloric, sulfuric, phosphoric acid and the like, for example common salt, calicum chloride, aluminum sulphate, and potassium alum. It is also possible to use acids, preferably aqueous solutions of strong mineral acids, advantageously 10 to 20% solutions, of for example sulphuric, hydrochloric or phosphoric acids. By this means, there are obtained colourless polymers which have analysis values corresponding to a polyethylene modified by incorporation of small quantities of the added copolymerisable acid compounds. The polymers can be pressed at temperatures above 100° C. in a softened condition to form plates and other shaped elements.

The products obtained from the emulsions prepared according to the invention by coagulation with acids or by drying the aqueous solutions at temperatures between room temperature and 150° C. are insoluble in organic solvents, such as petroleum ether, heptane, benzene, toluene, xylene, decalin, tetralin and chlorinated hydrocarbons, even under heat, and at most can only by softened to a small extent. Such cross-linked products have the advantage that finishes or coatings can be produced in part even in the cold state from the corresponding dispersion on substrata, such as leather, textiles and the like, which finishes or coatings, apart from having the aforesaid hydrophobic character, are also extremely resistant to solvent and in addition, particularly on polar supports, simultaneously have an excellent bonding strength.

The products obtained according to the process also have a considerable fastness to light.

The parts indicated in the following examples are parts by weight, unless otherwise indicated.

Example 1

A solution of 4 parts of methacryl-ω-aminoundecanic acid in 150 parts of N/10-caustic potash solution, 2 parts of tert.-sodium phosphate and 800 parts of distilled water are placed in a 1.3 litre high-pressure stirrer-type autoclave made of stainless steel. The pH value of the entire solution is 9.5. After adding 3 parts of potassium peroxy disulphite (corresponding to 2.24%, related to polymer), the autoclave is closed, flushed three times with a quantity of ethylene corresponding to a pressure of 10 atm. and thereafter is filled with ethylene up to a pressure of 70 atm. After heating to 80° C. within 30 minutes, the pressure rises to 130 atm. While stirring well, polymerisation takes place for 6 hours at 80° C. and at an ethylene pressure of 200 atm. while making up the pressure drop every hour. (This polymerisation technique is also used in similar manner in the following examples.) Altogether, a quantity of ethylene corresponding to a pressure drop totalling 283 atm. is introduced. After relieving the pressure, there are obtained 1030 parts of colourless emulsion with a pH value of 7 and a solid body content of 13% by weight. The polymer contains 0.11% by weight of nitrogen, corresponding to a content of 2.11% by weight of methacryl-ω-aminoundecanic acid.

Example 2

If 2.75 parts of acryl-ε-aminocaproic acid in 150 parts of N/10 potassium hydroxide solution and 800 parts of distilled water are polymerised with 3 parts of potassium peroxy-disulphate (corresponding to 2.06%, related to polymer) and at an ethylene pressure of 200 atm., in accordance with the reaction conditions set out in Example 1, there are obtained 1112 parts of a latex containing very little coagulate and having a pH value of 5, with 13% by weight of solid substance. This latex, after being dried on a glass plate at 100° C., provides a lustrous, cloudy, hydrophobic film. The polymer contains 1.45% by weight of acryl-ε-aminocaproic acid.

Example 3

(a) If a mixture having the initial pH value of 7.2 and prepared from 2 parts of potassium peroxydisulphate, 1 part of methacryl-ε-aminocaproic acid, 46.5 parts of N/10 potassium hydroxide solution, 800 parts of water, 70 parts of M/10 secondary potassium phosphate and 30 parts of M/10 primary potassium phosphate solution, is polymerised for 10 hours at 70° C., and under an ethylene pressure of 200 atm., 1082 parts of an emulsion with the pH value 5.5 and with a solid substance content of 14.2% by weight is obtained after an ethylene consumption which corresponds to a total pressure drop of 333 atm. 1.22% of initiator, calculated on the polymer, were used. The polymer contains 84.93% C and 14.39% H, whereas a carbon content of 78–80% is indicated for polymerisation products containing fatty alcohol or fatty alcohol sulphonate (Mod. Plast. 23, 153 et seq. (1946)). From the infra-red spectra or the band intensities of the carboxyl band in the $7\mu$ range of the —$CH_2$— and —$CH_3$— groups, it is possible to calculate that approximately 5–10 $CH_3$ groups are present for each 100 $CH_2$ units. The fact that methacryl-ε-aminocaproic acid has been incorporated into the polymer molecule is apparent from the bond intensities in the $6\mu$ range.

(b) In contrast hereto, 1149 parts of an emulsion with 21% by weight of solid substance and a pH value of 6 are obtained by polymerising for 18 hours instead of 10 hours and with a buffering agent/water ratio of 105 parts of M/10 secondary, 45 parts of M/10 secondary primary potassium phosphate solution and 750 parts of water under otherwise the same conditions as in the preceding example (initiator content in this case 0.85%, related to polymer).

Example 4

The dependence of the yield on the pH value of the reaction medium is shown by the following series of experiments:

In experiments a–g, the following reaction conditions were maintained: pressure: 200 atm. ethylene, reaction time: 10 hours, reaction temperature: 70° C., 1 part of methacryl-ε-aminocaproic acid, 2 parts of potassium peroxydisulphate, 46.5 parts of N/10 potassium hydroxide solution, 800 parts of water. The quantity of the buffering solutions and thus the pH value of the reaction medium was varied. It is seen from the table that the decrease in pressure, the yield of polymer and the solid body content of the latices reach a maximum at pH 7.

| Experiment | a | b | c | d | e | f | g |
|---|---|---|---|---|---|---|---|
| Parts M/10 $K_2HOP_4$ | 100 | 90 | 80 | 70 | 50 | 30 | 10 |
| Parts M/10 $KH_2PO_4$ |  | 10 | 20 | 30 | 50 | 70 | 90 |
| pH value | 9.0 | 7.95 | 7.55 | 7.2 | 6.8 | 6.52 | 5.82 |
| Total fall in pressure corresponding to ethylene consumption (atm.) | 115 | 229 | 247 | 333 | 268 | 265 | 178 |
| Yield parts by weight of polymer | 68 | 99 | 128 | 164 | 150 | 137 | 80 |
| Percent by weight of solid body in the latex | 6.6 | ——— | 11.2 | 13.8 | 13.4 | 13.0 | 8.2 |
| Quantity of initiator (related to polymer) in percent by weight | 2.9 | 2.01 | 1.56 | 1.22 | 1.3 | 1.65 | 2.5 |

Example 5

A mixture of 2 parts potassium peroxydisulphate (corresponding to 2.9%, related to polymer) 0.79 part of potassium salt of styrene sulphonic acid, 296 parts of water, 35 parts of M/10 secondary and 15 parts primary potassium phosphate solution with an initial pH value of 7.2 is polymerized in a high-pressure stirrer-type autoclave (0.7 l.) for 10 hours at 80° C. and under an ethylene pressure of 200 atm. There are obtained 373 g. of a latex with 18.5% of dry substance, from which a colourless polymer can be precipitated by coagulation with semi-concentrated hydrochloric acid, the said polymer containing 1.7 parts of styrene sulphonic acid.

Example 6

A mixture of 2 parts of potassium peroxydisulphate (corresponding to an initiator quantity of 0.79%, related to polymer), 1 part of sodium salt of vinyl sulphonic acid, 850 parts of water, 70 parts of M/10 secondary potassium phosphate solution, 30 parts of M/10 primary potassium phosphate solution with an initial pH value of 7.2 is polymerized within 18 hours in a 1.3 litre stirrer-type autoclave at 70° C. and an ethylene pressure of 200 atm. A coagulate-free, finely divided dispersion with a pH value of 6 and a solid body content of 19.6% by weight is obtained.

Example 7

Using a 5 litre stirrer-type autoclave and an ethylene pressure of 400 atm., a polyethylene dispersion of ph 6 with 18% by weight of solid body content is obtained after a polymerisation period of 18 hours by using a mixture of 5 parts of potassium peroxydisulphate (corresponding to 0.88%, related to polymer), 20 parts of methacryl-ε-aminocaproic acid, 98 parts of normal KOH, 2500 parts of $H_2O$, 270 parts of M/10 secondary potassium phosphate solution and 115 parts of M/10 primary potassium phosphate solution of the pH value 7.15.

Example 8

By polymerising the same quantities as in Example 3a but at a temperature of 65° C., for 18 hours and with addition of 2 parts of sodium pyrosulphite (corresponding to 1.96% of initiator component, persulphate together with pyrosulphite), 1115 parts of an emulsion are obtained with a pH value 5.5 and 19.2% by weight of solid substance.

Example 9

A solution of 82 parts of aminoacetic acid and 43.5 parts of sodium hydroxide in 820 parts of water is slowly mixed with 169 parts of ethyl methacrylate-β-isocyanate, the temperature being kept at 25° C. by external cooling. After acidifying with semi-concentrated hydrochloric acid, the clear solution is extracted by shaking with acetic ester. The separated organic phase, after drying over sodium sulphate and distilling off the solvent, yields a solid residue. After recrystallisation from acetic ester, ethyl methacrylate-β-ureido-acetic acid is obtained as colourless crystals with the melting point 113° C.

Using the reaction conditions as indicated in Example 1, 1.15 parts of ethyl methacrylate-β-ureidoacetic acid, 50 parts of normal potassium hydroxide solution, 800 parts of distilled boiled water, 2 parts of potassium peroxydisulphate, 70 parts of 1/10 M secondary potassium phosphate solution and 30 parts of 1/10 M primary potassium phosphate solution with an initial pH value of 7.2 are polymerised at an ethylene pressure of 200 atm. and at 70° C. within 18 hours. A coagulate-free latex is obtained with a solid body content of 16.8% by weight.

Example 10

Using the conditions as indicated in Example 1, at a temperature of 70° C. and an ethylene pressure of 200 atm., until the total pressure drop is 485 atm., a mixture of:

0.8 parts of maleic acid propyl semi-ester,
2 parts of potassium persulphate
50 parts of 0.1 N potassium hydroxide solution
70 parts of 0.1 molar secondary potassium phosphate solution,
30 parts of 0.1 molar primary potassium phosphate solution,
800 parts of distilled water is polymerised. The pH value of the reaction medium is 7.3 on commencement of the polymerisation, whereas the latex shows a pH value of 5.5. 1120 parts of a stable polyethylene latex with 20.8% solid substance are obtained. Accordingly, 0.68% of initiator and 0.35% of incorporated emulsifier are used (related to polymer). The emulsion can be concentrated by evaporation in vacuo at 50° C. to 32% solid substance without coagulation.

Example 11

If the maleic acid propyl semi-ester is replaced by 1.15 parts of maleic acid octyl semi-ester, using otherwise the same quantities as in Example 10 and also the same reaction conditions, the pressure drop within 18 hours is 450 atm. 1082 parts of a coagulate-free emulsion with 17% solid substance are obtained. There are consequently employed 1.08% of initiator and 0.62% of semi-ester related to polymer.

Example 12

Polymerisation is carried out in a manner similar to Example 10, but replacing the maleic acid semi-ester by 0.72 part of anhydrous acrylic acid and the equivalent quantity of potassium hydroxide. After 18 hours there are obtained 1146 parts of an emulsion containing very little coagulate and having a pH of 6 with 18.2% solid body content.

Example 13

222 parts of a 33% aqueous sodium taurine solution are diluted with 80 parts of distilled water, adjusted with 20% sulphuric acid to a pH value of 9 to 10, and 78 parts of ethyl methacrylate-β-isocyanate are added at 25° C. After stirring for 2 hours, this solution (a) can be immediately used for polymerisation purposes.

Under the same reaction conditions as in Example 1, an aqueous solution of:

1.7 parts of ammonium peroxydisulphate
2 parts of the solution (a), which contains the compound:

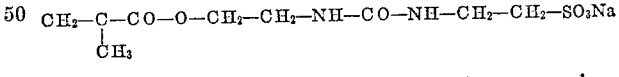

70 parts of 1/10 molar aqueous secondary potassium phosphate solution,
30 parts of 1/10 molar aqueous primary potassium phosphate solution and
850 parts of distilled boiled water is polymerised at 70° C. within 18 hours at an initial pH value of 7.2. A coagulate-free latex with a pH value of 5 and with a solid body content of 24.6% is obtained.

Example 14

460 parts of a 33% sodium taurine solution are mixed with a third of a solution (A) of 40 parts of sodium hydroxide in 500 parts of water and a total of 104.5 parts of methacrylic acid chloride and the remaining two thirds of solution A are added in portions to this mixture at a temperature of −10 to 0° C. After stirring for 1 hour, nitrogen is conducted through the solution until the odour of traces of acid chloride has disappeared. The solution contains 21.4% by weight of sodium salt of methacryl taurine:

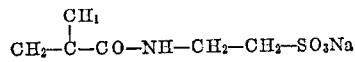

Under the reaction conditions as indicated in Example 1 an aqueous solution of:

1.7 parts of ammonium peroxy-disulphate,
2.4 parts of the above methacryl taurine solution
0.3 part of N/10 sodium hydroxide solution
80 parts of a 1/10 molar aqueous secondary potassium phosphate solution
20 parts of a 1/10 molar aqueous primary potassium phosphate solution and
800 parts of distilled boiled water is polymerised at 75° C. within 18 hours at an intial pH value of 8.1. A coagulate-free latex with a solid content of 16.5% and a blue fluorescence is obtained.

Example 15

(Example for employment of a disulphimide).—Under the same reaction conditions as indicated in Example 1, an aqueous solution of:

7.7 parts of potassium peroxydisulphate,
3.8 parts of 3-(methacroylamino)-benzene sulphonic acid-(N-benzene sulphonyl)-amide (prepared according to Belgian patent specification 587,783, Example 7 resp. 1)

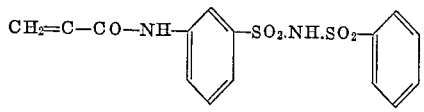

124 parts of 1/10 N-potassium hydroxide solution
342 parts of 1/10 molar aqueous secondary potassium phosphate solution
38 parts of 1/10 molar aqueous primary potassium phosphate solution and also
2900 parts of distilled water is polymerized at 75° C. within 7 hours at an initial pH value of 8.1. 3720 parts of a latex with the pH value=5 with a solid content of 20% are obtained. In accordance herewith, 0.51% by weight of sulphamide is used, related to the polymer.

Example 16

Cotton-wool fabric is padded with a polyethylene emulsion which is prepared according to Example 1 and which contains 60 g. of solid substance per litre, and the fabric is thereafter dried at 95–100° C. The fabric is thereby given a full, slightly stiffening "handle," combined with a considerable improvement in the abrasion resistance.

A similar effect is obtained when staple rayon fabrics are finished in the same way.

A further object of the present invention is represented by the use of said aqueous emulsions for production of coated papers. For this purpose fibrous substrates, preferably paper is impregnated with said emulsions by brushing, spraying or similar methods and, after drying, subjecting to a heating period ranging between 20 sec. and 10 minutes, preferably up to 5 minutes, whereby temperatures of about 110–130° C. are applied.

The coated papers obtained in this manner prove non-tacky up to temperatures of about 80° C. Furthermore, said coated papers show a water-repellent effect, but on the other hand good permeability to water vapor. Said papers may be heat sealed or welded together or with other plastic coated materials or plastics as for example polyethylene films and the like by applying temperatures above 110° C. and if necessary, pressure.

Example 17

For a limited time absorbent unsized paper from 80 parts by weight of cellulose and 20 parts by weight of mechanical wood pulp is dipped into an emulsion (having a solid content of 25 percent by weight) of a copolymerisation product of ethylene and aminocaproic acid as prepared according to Example 4d. After squeezing off and drying the impregnated paper is heated to about 120° C. for 2–3 minutes. A sheet of paper treated in such a manner proves free from tackiness up to 80° C. On the other hand, it is possible welding together coated papers of this type and other fibrous substrates coated in the same manner as well as foils and films of extruded polyethylene when employing temperatures above 110° C. Coated papers of this type are suited as food packaging materials.

Example 18

Weakly sized coating paper from about 70 parts by weight cellulose and 30 parts by weight of mechanical wood pulp is brushed one-sided with a 35 percent emulsion of a copolymerisation product of ethylene and sodium-vinyl-sulphonate prepared according to Example 6. An excess of said emulsion is removed by means of a doctor knife. After drying by exposure to the air the web of paper is heated up to 125–135° C. for 20–25 sec. by means of infrared-rays. After cooling the coated papers are non-tacky. Furthermore, said coated webs of paper show non-tackiness when unrolled under usual working temperatures, i.e. temperatures up to about 70° C.

Said coated papers prove capable of welding together as well as welding with extruded or pressed polyethylene films.

The coating shows a water-repellent effect, but on the other hand is permeable to water vapor.

Example 19

Weakly sized coating paper from 60 parts by weight of cellulose and 40 parts by weight of mechanical wood pulp is primarily brushed with a pigmented copolymerisate emulsion. Said pigmented copolymerisate emulsion is prepared by adding 50 parts by weight of a pigment mixture containing kaolin and precipitated calcium carbonate in a ratio 3:7 to 100 parts by weight of a copolymerisate emulsion, the latter having a solid content of 40 percent by weight and being obtained by copolymerisation of 40 parts by weight of butadiene, 40 parts by weight of acrylonitrile and 20 parts by weight of a styrene in usual manner.

After drying the web of paper pretreated in this manner at temperatures of about 100–110° C. a second coating is applied. For this a 30 percent (solid content) copolymer emulsion prepared according to Example 6 is used. After drying at 100° C. a non-tacky surface of the paper is obtained, contrast to the tacky surface of the paper after impregnation with said butadiene-acrylonitrile-styrene polymer. Rolling up these webs of paper may take place at usual working temperatures (40–70° C.) without danger of sticking together.

Example 20

Starch is hydrolyzed in a usual manner by stirring up with water, adding a 10 percent sodium hydroxide solution and heating to 60–70° C. for about 1 hour. After neutralizing by means of diluted hydrochloric acid the starch solution is cooled and 2 percent by weight iron yellow as well as 50 percent by weight of a mixture of chalk and barite (6:4), both calculated on the total amount of the solution, were added. This solution is mixed with a 35 percent by weight (solid content) emulsion of a copolymerisate of ethylene and sodium vinyl sulphonate according to Example 6 in an amount adequate 70 parts by weight of solid copolymers per 100 parts by weight solid pigment of said solution.

Absorbent wall-paper consisting of 30 parts by weight of unbleached sulfite pulp and 70 parts by weight of mechanical wood pulp is brushed with said mixture. After drying by hanging and 2 to 5 minutes heating up to 125° C. wallpapers are obtained which show good wet cleaning stability and permeability to water vapor (respiration) without simultaneous increase of luster.

The aqueous copolymer dispersions as well as the copolymers itself according to the present invention are free from usual emulsifiers or more especially free from emulsifiers being devoid of polymerisable groupings. By emulsifiers of said type there are to be understood surface-active substances containing in its molecules a hydrophilic group and a hydrophobic part as for example sulphonated paraffin, hydrocarbon, fatty alcohol sulphates, long chain quaternary ammonium salts, as for example octadecyl sulphate, dodecylsulphate, dodecylsulfonate, dodecyl trimethyl ammonium methosulphate.

What is claimed is:

1. A process for the preparation of stable aqueous emulsions of ethylene copolymers, said process consisting of the steps of copolymerizing ethylene in an aqueous medium in the presence of 0.1–10% by weight, based on the polymer, of an ethylenically unsaturated acid compound, the acidic substituent of which is a sulfinimide group, maintaining the temperature between 10°–100° C. and the pressure above 100 atmospheres during polymerization, using as the polymerization catalyst 0.1–3% by weight of a water-soluable inorganic peroxy compound and recovering resulting stable aqueous emulsions of ethylene copolymer.

2. The process of claim 1 wherein polymerization is carried out at a pH range of 5 to 7.

3. The process of claim 1 wherein said ethylenically unsaturated acid compound is a disulfinamide.

4. The process of claim 1 wherein said polymerization catalyst is used in combination with a reducing agent.

5. A process for the preparation of stable aqueous emulsions of ethylene copolymers, said process consisting of the steps of copolymerizing ethylene in an aqueous medium in the presence of 0.1–10% by weight, based on the polymer, of an ethylenically unsaturated acid compound, the acidic substituent of which is a sulfinimide group, maintaining the temperature between 10°–100° C. and the pressure above 100 atmospheres during polymerization, and using as a polymerization catalyst 0.1–3% by weight of a water-soluble inorganic peroxy compound.

6. A process for the preparation of stable aqueous emulsions of ethylene copolymers, said process consisting of the steps of copolymerizing ethylene in an aqueous medium in the presence of 0.1–10% by weight, based on the polymer, of an ethylenically unsaturated acid compound, the acidic substituent of which is —COOH, maintaining the temperature between 10°–100° C. and the pressure above 100 atmospheres during polymerization, using as the polymerization catalyst 0.1–3% by weight of a water-soluble inorganic peroxy compound of the group consisting of alkali metal perborates and hydrogen peroxide, and recovering resulting stable aqueous emulsion of ethylene copolymer.

7. The process of claim 6 wherein said ethylenically unsaturated acid compound is a compound according to the formula:

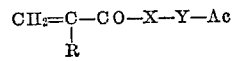

wherein R represents a radical selected from the group consisting of hydrogen and methyl, X represents divalent radical being selected from the group consisting of —NH—, —O—, —S— and —NR'—, R' being a lower aliphatic hydrocarbon radical having 1 to 5 carbon atoms, Y represents a divalent radical selected from the group consisting of a divalent hydrocarbon radical having at least 2, but not more than 18 carbon atoms, a divalent radical derived from a hydrocarbon radical and containing a urea group in the chain, and a divalent radical derived from a hydrocarbon radical and containing a urethane grouping in the chain, and Ac represents a carboxyl group.

8. The process of claim 6 wherein said ethylenically unsaturated acid compound is an $\alpha,\beta$-ethylenically unsaturated monocarboxylic acid.

9. The process of claim 6 wherein said ethylenically unsaturated acid compound is an $\alpha,\beta$-ethylenically unsaturated dicarboxylic acid.

10. The process of claim 6 wherein said ethylenically unsaturated acid compound is a maleic acid monoester.

11. The process of claim 6 wherein polymerization is carried out within a pH range of 5 to 7.

12. The process of claim 6 wherein said polymerization catalyst is used in combination with the reducing agent.

13. A process for the preparation of stable aqueous emulsion of ethylene copolymers, said process consisting of the steps of copolymerizing ethylene in an aqueous medium in the presence of 0.1–10% by weight, based on the polymer, of an ethylenically unsaturated acid compound, the acidic substituent of which is —CCOH, maintaining the temperature between 10°–100° C. and the pressure above 100 atmospheres during polymerization, and using as the polymerization catalyst 0.1–3% by weight of a water-soluble inorganic peroxy compound of the group consisting of alkali metal perborates and hydrogen peroxide.

References Cited

UNITED STATES PATENTS

| | | | |
|---|---|---|---|
| 2,296,403 | 9/1942 | Renfrew | 260—89.5 |
| 2,300,920 | 11/1942 | Heuer | 260—29.6 |
| 2,387,755 | 10/1945 | Hanford | 260—78.5 |
| 2,449,489 | 9/1948 | Larson | 260—29.6 |
| 2,462,390 | 2/1949 | Harmon | 260—29.6 |
| 2,914,499 | 11/1954 | Sheetz | 260—29.6 |

FOREIGN PATENTS 813,814   5/1959   Great Britain.

SAMUEL H. BLECH, Primary Examiner.

PAUL LIEBERMAN, Assistant Examiner.

U.S. Cl. X.R.

117—155, 161, 140; 160—78.5, 79.7, 88.1